United States Patent [19]
Chan et al.

[11] Patent Number: 5,692,219
[45] Date of Patent: Nov. 25, 1997

[54] SYSTEM AND METHOD FOR DISABLING OR RE-ENABLING PCI-COMPLIANT DEVICES IN A COMPUTER SYSTEM BY MASKING THE IDSEL SIGNAL WITH A DISABLE OR RE-ENABLE SIGNAL

[75] Inventors: Wai-Ming Richard Chan; Stuart Hayes; James Van Artsdalen, all of Austin, Tex.

[73] Assignee: Dell USA, LP

[21] Appl. No.: 485,056

[22] Filed: Jun. 7, 1995

[51] Int. Cl.⁶ .................................................. G06F 13/00
[52] U.S. Cl. ........................ 395/869; 395/500; 395/726; 395/828; 395/856
[58] Field of Search ......................... 395/288, 299, 395/306, 308, 500, 750, 726, 828, 856, 869

[56] References Cited

U.S. PATENT DOCUMENTS

| 5,446,869 | 8/1995 | Padgett et al. | 395/500 |
| 5,450,551 | 9/1995 | Amini et al. | 395/299 |
| 5,471,590 | 11/1995 | Melo et al. | 395/288 |
| 5,499,346 | 3/1996 | Amini et al. | 395/308 |
| 5,517,650 | 5/1996 | Bland et al. | 395/750 |
| 5,522,050 | 5/1996 | Amini et al. | 395/306 |
| 5,550,989 | 8/1996 | Santos | 395/306 |
| 5,557,758 | 9/1996 | Bland et al. | 395/308 |

*Primary Examiner*—Thomas C. Lee
*Assistant Examiner*—Po C. Huang
*Attorney, Agent, or Firm*—Arnold, White & Durkee

[57] ABSTRACT

A system and method for disabling and re-enabling PCI-compliant devices in a computer system is disclosed. The system includes a CPU, a host bus coupled to the CPU, a PCI/Host bridge coupled to the host bus, one or more PCI-compliant devices, a PCI bus coupling the PCI/Host bridge and the PCI-compliant devices, and a device, typically in the form of a digital gate, for selectively disabling or re-enabling one or more of the PCI-compliant devices. The disclosed method operates in connection with a computer system having a CPU, a PCI/Host bridge coupled to the CPU and capable of sending an IDSEL signal to the IDSEL input pin of a target PCI-compliant device when attempting a read or write operation on the target PCI-compliant device, and one or more system I/O registers having a CONFIG ENABLE bit that reflects a user's request to disable or re-enable a PCI-compliant device. The method intercepts the IDSEL signal before it reaches the IDSEL input pin of the target PCI-compliant device, provides the intercepted IDSEL signal to the input of a digital gate such as an AND gate, provides a signal corresponding to the CONFIG ENABLE bit to the input of the same digital gate, and delivers the resulting output signal from the digital gate to the IDSEL input pin of the target PCI-compliant device.

9 Claims, 1 Drawing Sheet

SYSTEM AND METHOD FOR DISABLING OR RE-ENABLING PCI-COMPLIANT DEVICES IN A COMPUTER SYSTEM BY MASKING THE IDSEL SIGNAL WITH A DISABLE OR RE-ENABLE SIGNAL

BACKGROUND OF THE INVENTION

This invention relates to a system and method for disabling Peripheral Component Interconnect (PCI)-compliant devices through hardware by controlling the Initialization Device Select (IDSEL) signal to a PCI-compliant device using system Input/Output (I/O) registers. The invention advantageously permits users to disable user-selected onboard PCI-compliant devices, such as video controllers or Small Computer System Interface (SCSI) controllers. Users may, for example, wish to substitute another PCI-compliant device in place of a particular PCI-compliant device provided by the computer manufacturer. In other cases, users may wish to disable a particular PCI-compliant device either temporarily or indefinitely.

At the present time, several computer manufacturers provide a user-initiated software method of disabling PCI-compliant devices. The software that accomplishes disablement of PCI-compliant devices is typically found in the Basic Input/Output System (BIOS) memory of a computer system. (BIOS is the firmware in a personal computer that interfaces directly with the hardware to perform I/O and other low-level functions. Typically this firmware is permanently stored in Read Only Memory or flash memory on the computer system's motherboard.) Subsequently, when the computer system is powered on, the system's Power On Self Test (POST) is executed. During POST, software contained in BIOS memory determines which PCI-compliant devices are disabled. Upon determining that a particular PCI-compliant device is disabled, the BIOS software does not initialize and execute the Read-Only Memory (ROM) associated with that device. However, the configuration space that is reserved by the system for each onboard PCI-compliant device is still accessible to system software, including operating system software. This configuration space remains accessible because the PCI specification does not recognize the concept of a PCI-compliant device being "disabled" by BIOS software.

As operating system software has become increasingly sophisticated, there has developed a clear trend toward automatically configuring all devices attached to the computer system, including PCI-compliant devices. Certain recent generations of operating systems—e.g., Microsoft Windows NT, and possibly the forthcoming Microsoft Windows 95 product—are likely to continue this trend. Specifically, the operating system software will endeavor to detect all accessible hardware associated with a computer system. The operating system software will detect and have access to the disabled PCI-compliant device's configuration space and possibly attempt to initialize it. Thus, despite a user's express request to disable a particular PCI-compliant device, the operating system software will detect the device's configuration space and re-activate it.

Therefore, what is needed is a hardware-based method for disabling PCI-compliant devices of a computer system to avoid the problem of operating system software detecting disabled devices and initializing them in contravention of the user's requests.

SUMMARY OF THE INVENTION

In a method in accordance with the invention, executable software contained in BIOS memory controls the state of the IDSEL signal to a PCI-compliant device using I/O registers of the computer system. Using utility software contained in BIOS memory, a user can request that one or more PCI-compliant devices be disabled. Upon request to disable a device, the software contained in the BIOS memory will control the state of the IDSEL signal to the affected PCI-compliant device, thereby disabling the device and preventing configuration space from being reserved for the device. IDSEL is a physical line in the PCI bus architecture—a PCI-compliant device generates an IDSEL signal in response to an I/O inquiry from, for example, the operating system. By providing a "gated" IDSEL, a PCI-compliant device can be disabled and re-enabled at the user's request via a BIOS routine. Once disabled via the method of the present invention, computer system software, including operating system software such as Microsoft Windows NT or possibly the forthcoming Microsoft Windows 95, will not detect the presence of the device and attempt to re-activate it.

DETAILED DESCRIPTION OF SPECIFIC EMBODIMENTS

Figure 1:
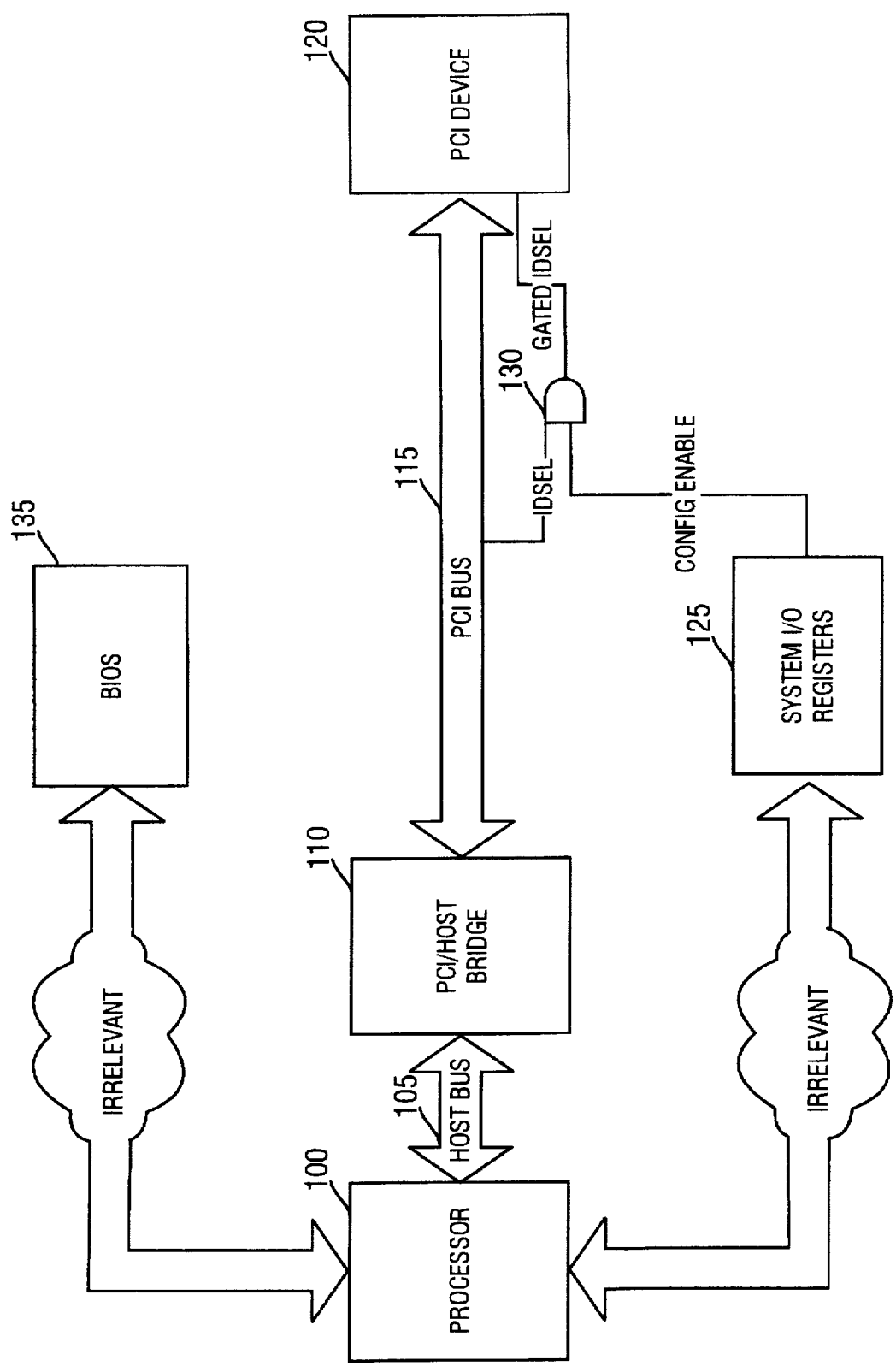
FIG. 1 is a block-diagram view of a computer system including depictions of components used in a method in accordance with the present invention.

One implementation of the invention is described here for purposes of illustration, namely a hardware-based method of disabling one or more PCI-compliant devices in a computer system by using system I/O registers to control the state of the IDSEL signal to the target device(s). The machine-executed method is invoked at the user's request and is performed by executable computer software contained in BIOS memory. An actual implementation of such computer code might be executable on an Intel 80×86—based or Pentium™—based computer system, or on other suitable processor-based computer systems.

(It will be appreciated by those of ordinary skill, of course, that references to the performance of method steps by computer software actually mean that a computer, or one of its components, is performing the method steps in response to the instructions encoded in the computer software.)

In the interest of clarity, not all features of an actual implementation are described in this specification. It will, of course, be appreciated that in the development of any such actual implementation (as in any hardware or software development project), numerous design and programming decisions must be made to achieve the developers' specific goals and subgoals (e.g., compliance with system-related and business-related constraints), which will vary from one implementation to another. Moreover, attention will necessarily be paid to, e.g., proper serialization to handle concurrent events. It will be appreciated that a development effort of this type might be complex and time-consuming, but would nevertheless be a routine undertaking of computer system design and development for those of ordinary skill having the benefit of this disclosure.

Depicted now in FIG. 1 is a high-level block diagram of the computer system operating environment in which the method of the present invention may be implemented. The elements of a computer system not necessary to understand the operation of the present invention have been omitted for simplicity. The computer system includes CPU 100 which is coupled to host bus 105. Host bus 105 includes address, data, and control portions. The host bus 105 is coupled to PCI/Host Bridge 110, which, in turn, is coupled to PCI bus 115. PCI/Host Bridge 110 is a microchip that controls PCI bus 115.

PCI bus 115 is a 32-bit local bus supporting relatively high data-transfer speeds (up to 132 megabytes per second at 33 megahertz.). Advantages of the PCI bus standard include greater speed than that obtainable from Industry Standard Architecture (ISA) and Extended Industry Standard Architecture (EISA) buses, as well as automatic configuration of PCI-compliant devices that are added to, changed, or removed from a computer system utilizing the PCI bus architecture. Automatic configuration of PCI-compliant devices is accomplished, in part, by information provided in registers contained in the PCI-compliant devices themselves. The content and addressable locations of the registers contained in the PCI-compliant devices are dictated by PCI bus architecture standards.

PCI Bus 115 is coupled to one or more PCI-compliant devices 120. PCI/Host Bridge 110 produces a signal across PCI bus 115 on the IDSEL pin of PCI-compliant device 120 when said device 120 is the target of a configuration command (read or write). In this sense, the IDSEL pin of a PCI-compliant device functions very much like a classical "chip select" signal.

The present invention allows the user to disable a PCI-compliant device via hardware-based control of the IDSEL signal. In one implementation, the IDSEL signal from PCI bus 115 directed to the target PCI-compliant device 120 is gated through AND gate 130. Thus, the IDSEL signal from PCI bus 115 serves as one input to AND gate 130. The second input to AND gate 130 is CONFIG ENABLE signal from a bit set in system I/O registers 125. In the present illustration, system I/O registers 125 can be system-specific registers with addressable locations known only to the manufacturer of a given computer system, but not generally known to third party hardware or software developers. Because the addressable locations of system I/O registers 125 are in undocumented locations, system software developers, including developers of operating system software such as Microsoft Windows NT or possibly the forthcoming Microsoft Windows 95, do not attempt to access them. Alternatively, the addressable locations of system I/O registers 125 could be fully documented and made known to third party developers, but be implemented as "write once" registers, as is well known in the art. If implemented as "write once" registers, the bit corresponding to CONFIG ENABLE would be set once during POST, and then remain unchangeable until the computer system is re-booted. Under either of these implementations, the CONFIG ENABLE signal is generated from a bit set in system I/O registers 125, said bit being set by software contained in the computer system BIOS 135.

Responsive to a request by the user to deactivate or re-activate a particular PCI-compliant device 120, software contained in the computer system BIOS 135 can either set a bit in system I/O registers 125 to either a '1' or '0.' This bit is identified as CONFIG ENABLE, and provides the second input to AND gate 130. Whether the system I/O registers 125 are implemented in undocumented addressable locations or as "write once" registers, the software contained in BIOS 135 will manipulate the CONFIG ENABLE bit in response to requests for deactivation and re-activation by the user. If system I/O registers 125 are implemented in undocumented addressable locations, third party software developers, including operating system software developers, will typically not be able to address these system I/O registers 125.

If system I/O registers 125 are implemented as "write once" registers, third party software developers will not be able to manipulate the contents of these registers because a write operation to these registers will occur during POST.

Because the present invention makes use of system I/O registers for the purpose of gating the IDSEL pin of a PCI-compliant device, existing and future operating system software will not override or otherwise ignore a user's affirmative request to disable or re-enable a particular PCI-compliant device. Once a PCI-compliant device is disabled using this hardware-based solution, operating system software will not attempt to assign system resources to a device which a user has specifically disabled.

Those of ordinary skill in the art will recognize that them are many alternative implementations to gate the IDSEL signal to a PCI-compliant device. The use of an AND gate combining as inputs the IDSEL signal coming from the PCI bus and the CONFIG ENABLE signal coming from a bit set in system I/O registers is but one specific implementation of gating IDSEL. Therefore, it will be appreciated by those of ordinary skill, having the benefit of this disclosure, that numerous variations from the foregoing illustration will be possible without departing from the inventive concept described therein. Accordingly, it is the claims set forth below, and not merely the foregoing illustrations, which are intended to define the exclusive rights claimed in this application.

What is claimed is:

1. A system for disabling and re-enabling PCI-compliant devices in a computer system, comprising:
    (a) a central processing unit;
    (b) a host bus coupled to said central processing unit for transmitting digital signals from and to said central processing unit;
    (c) a PCI/Host bridge coupled to said host bus;
    (d) one or more PCI-compliant devices, wherein each of said one or more PCI-compliant devices includes a readable and writeable configuration address space;
    (e) a PCI bus coupled between said PCI/Host bridge and said one or more PCI-compliant devices for transmitting digital signals between said PCI/Host bridge and any of said one or more PCI-compliant devices, wherein said digital signals include an IDSEL signal that is directed to an IDSEL input pin of any of said PCI-compliant devices and made 'active' when a read or write operation is to be performed on said configuration address space of said PCI-compliant device; and
    (f) means for selectively disabling or re-enabling any of said one or more PCI-compliant devices upon request by a user of said computer system.

2. A system in accordance with claim 1, wherein said means for selectively disabling or re-enabling any of said one or more PCI-compliant devices comprises, means for selectively permitting an 'active' IDSEL signal that is directed to an IDSEL input pin of one of said PCI-compliant devices to reach said PCI-compliant device.

3. A system in accordance with claim 2, wherein said means for selectively permitting an 'active' IDSEL signal that is directed to one of said PCI-compliant devices to reach said PCI-compliant device comprises:
    (a) means responsive to user-specified input for indicating with a digital signal that said PCI-compliant device is to be disabled or re-enabled; and
    (b) means for combining said 'active' IDSEL signal and said user-specified digital signal as inputs to an electronic logic gate, with an output from said electronic logic gate providing a resulting signal to the IDSEL input pin of said PCI-compliant device.

4. A system in accordance with claim 3, wherein said electronic logic gate is an AND gate.

5. A system in accordance with claim 3, wherein said means for indicating with a digital signal comprises:

(a) at least one set of system I/O registers coupled to said central processing unit, said registers having a plurality of bits that are capable of digitally representing 1's or 0's in response to instructions executed by said central processing unit, and said plurality of bits including a bit corresponding to said digital signal indicating that said PCI-compliant device is to be disabled or re-enabled; and (b) a BIOS memory coupled to said central processing unit and containing firmware instructions, said firmware instructions executable by said central processing unit for performing I/O and other low-level functions in said computer system, including executable firmware instructions for manipulating said bit corresponding to said digital signal indicating that said PCI-compliant device is to be disabled or re-enabled.

6. A system in accordance with claim 5, wherein said means for combining comprises, an AND gate having a first input, a second input, and an output to be provided to said IDSEL input pin of one of said PCI-compliant devices, said first input corresponding to said IDSEL signal that is directed to said IDSEL input pin of one of said PCI-compliant devices, said second input corresponding to said bit corresponding to said digital signal indicating that said PCI-compliant device is to be disabled or re-enabled, and said output corresponding to the signal resulting from performing a Boolean AND operating on said first and second inputs.

7. In a computer system having a central processing unit, a PCI/Host bridge communicatively coupled to said central processing unit, said PCI/Host bridge sending an IDSEL signal to a target PCI-compliant device having a readable and writeable configuration address space coupled to said PCI/Host Bridge by a PCI bus, said IDSEL signal sent to an IDSEL input pin of said target PCI-compliant device when said configuration address space of said target PCI-compliant device is the subject of a read or write operation, and one or more system I/O registers containing at least one re-enable and writeable CONFIG ENABLE bit location corresponding to said target PCI-compliant device and indicating that said target PCI-compliant devices is to be either disabled or re-enabled according to an affirmative user request, a method of selectively disabling and re-enabling PCI-compliant devices, comprising (a) intercepting said IDSEL signal before said IDSEL signal reaches said IDSEL input pin of said target PCI-compliant device;

(b) providing said IDSEL signal to a first input of a digital gate;

(c) providing a signal corresponding to the content of said CONFIG ENABLE bit location to a second input of said digital gate; and (d) delivering a digital signal resulting from the operation of said digital gate to said IDSEL input pin of said target PCI-compliant device.

8. A method in accordance with claim 7, wherein said digital gate is a Boolean logic gate.

9. A method in accordance with claim 8, wherein said digital Boolean logic gate is an AND gate.

* * * * *

UNITED STATES PATENT AND TRADEMARK OFFICE
CERTIFICATE OF CORRECTION

PATENT NO.    :  5,692,219

DATED         :  November 25, 1997

INVENTOR(S)   :  Wai-Ming Richard Chan, Stuart Hayes and James Van Artsdalen

It is certified that error appears in the above-identified patent and that said Letters Patent is hereby corrected as shown below:

In claim 7, column 6, line 11, delete "re-enable" and insert --readable-- therefor.

Signed and Sealed this

Twenty-eighth Day of April, 1998

Attest:

BRUCE LEHMAN

Attesting Officer

Commissioner of Patents and Trademarks